United States Patent [19]

Luc

[11] Patent Number: 4,956,134

[45] Date of Patent: Sep. 11, 1990

[54] METHOD OF AND APPARATUS FOR CONTROLLING THE FILLING OF A MOLD WITH A PULVERULENT REFRACTORY MATERIAL

[75] Inventor: Jean-Claude Luc, Avon, France

[73] Assignee: Quartz et Silice, Courbevoie, France

[21] Appl. No.: 274,575

[22] Filed: Nov. 22, 1988

[51] Int. Cl.$^5$ .................. B29C 39/44; B29D 24/00
[52] U.S. Cl. ................. 264/40.2; 156/DIG. 83;
  264/40.7; 264/114; 264/311; 425/141; 425/174;
  425/435; 425/147
[58] Field of Search .............. 264/40.2, 40.7, 310,
  264/40.1, 311, 40.5, 114; 425/140, 141, 162,
  163, 166, 174, 429, 435, 147; 156/DIG. 83

[56] References Cited

U.S. PATENT DOCUMENTS

| | | | |
|---|---|---|---|
| 1,936,820 | 11/1933 | Benner et al. | 425/425 |
| 3,081,485 | 3/1963 | Steigerwald | 425/135 |
| 3,409,709 | 11/1968 | Cleereman et al. | 264/40.2 |
| 3,412,431 | 11/1968 | Lemelson | 425/429 |
| 3,551,947 | 6/1971 | Jennings | 425/166 |
| 4,528,163 | 7/1985 | Albrecht | 422/249 |
| 4,629,878 | 12/1986 | Blanc et al. | 250/202 |
| 4,632,686 | 12/1986 | Brown et al. | 264/102 |
| 4,639,140 | 1/1987 | Lerat | 356/376 |

FOREIGN PATENT DOCUMENTS

| | | | |
|---|---|---|---|
| 3628056 | 4/1987 | Fed. Rep. of Germany | 264/40.2 |
| 55-34957 | 3/1980 | Japan | 425/140 |
| 57-110907 | 7/1982 | Japan | 264/40.2 |
| 58-90130 | 5/1983 | Japan . | |
| 1098801 | 6/1984 | U.S.S.R. | 425/140 |
| 1595222 | 8/1981 | United Kingdom | 264/40.2 |

OTHER PUBLICATIONS

"Laser Beam Controls Crystal Growth", *Solid State Technology*, vol. 16, No. 8, Aug. 1973, p. 8.

*Primary Examiner*—Jeffery Thurlow
*Assistant Examiner*—Mathieu Vargot
*Attorney, Agent, or Firm*—Pennie & Edmonds

[57] ABSTRACT

A method and apparatus for manufacturing one phase of a silica crucible including controlling the filling of a hollow mold of cylindrical shape, which rotates about its vertical axis, with grains of crystallized quartz. The grains of material are continuously introduced into the mold and are deposited on or near the lateral wall face of the mold in the form of a cylindrical layer, E, of internal radius R. A beam of light is directed to form a luminous spot on the summit of the layer from the commencement of its formation and the radial displacement of the spot on the layer is observed. The height at which the grains are introduced and the height of the trajectory of the luminous beam are modified as a function of the position of the luminous spot relative to determined reference points.

14 Claims, 1 Drawing Sheet

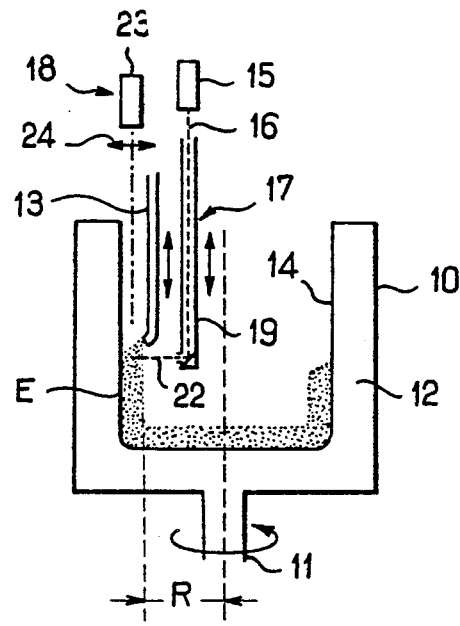
FIG_1
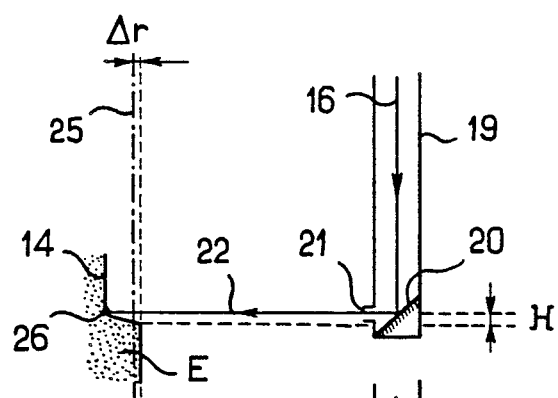
FIG_2B
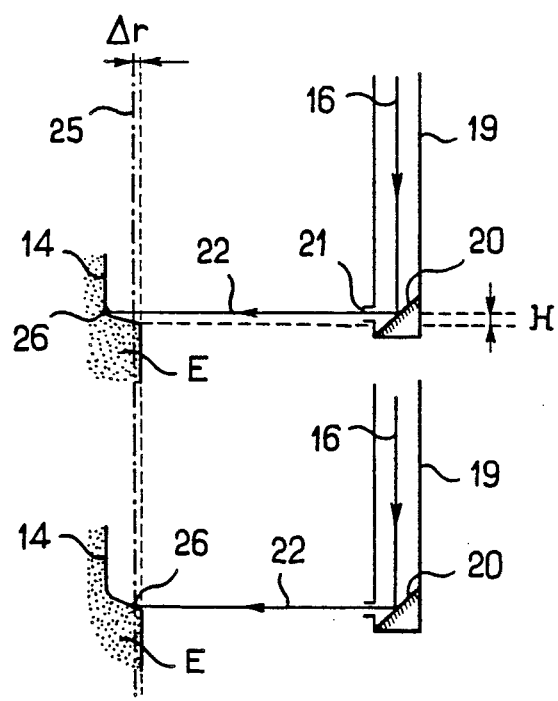
FIG_2A

METHOD OF AND APPARATUS FOR CONTROLLING THE FILLING OF A MOLD WITH A PULVERULENT REFRACTORY MATERIAL

TECHNICAL FIELD

This invention relates to a method and an apparatus for controlling the filling of a hollow mold, of circular cross-section, with a pulverulent refractory material such as crystallized quartz powder.

BACKGROUND ART

It is known to continuously deposit grains of a refractory material, for example grains of crystallized quartz, into the base and internal wall of a mold rotating about its vertical axis. When this operation has been carried out, a heat source is introduced into the mold, still kept in rotation, in such a way as to melt the grains to a certain depth. This method enables crucibles of silica, for example, to be produced.

At the same time, in order to economize the quantity of material necessary and reduce the time required for the filling operation, it is desirable to accurately control the means used for introducing the grains of material.

It is already known, from U.S. Pat. No. 4,528,163, to introduce quartz grains by means of a cranked tube, connected at its upper part to a hopper filled with quartz; the opening formed at the lower end of said tube is orientated towards the lateral wall of the mold. A layer of grains is obtained by raising the lower end of the tube from the bottom of the mold to the summit of the lateral wall. The speed of raising is constant and is preregulated as a function of the quantity of material which flows from the tube.

SUMMARY OF THE INVENTION

The present invention relates to the continual controlling of the quantity of grains deposited on the lateral wall of the mold, in order to obtain a uniform layer of predetermined thickness.

The method of control of this invention, according to which the grains of a refractory material are introduced into a hollow mold of cylindrical form which rotates about its vertical axis, in such a way as to deposit against or in proximity to the lateral wall of said mold a cylindrical layer of internal radius R, consists essentially of directing a beam or ray of light in such a way as to form a luminous spot on the summit of the layer right from the start of its formation, then of observing the radial displacement of said spot on said summit, and of modifying the height at which the grains are introduced and the trajectory of the luminous beam as a function of the position of the luminous spot relative to determined reference points.

After one or more reflections, the beam of light giving rise to the luminous spot follows a substantially horizontal path. The luminous spot may be a simple point generated by a narrow fixed beam, or a horizontal stroke in an arc of a circle formed, for example, by a narrow beam intercepting the summit of the layer.

According to one of the characteristics of the invention, the whole or part of the summit of the layer in formation is observed, the luminous spot is formed at a distance $R + \Delta r$ from the axis of rotation of the mold and the height at which the grains are introduced and the height of the trajectory of the luminous beam are continually modified in such a way that the spot remains at the distance $R + \Delta r$.

According to another characteristic of the invention, the luminous spot is formed on the summit of the layer in formation, a precise point situated at a distance $R + \Delta r$ from the axis of rotation of the mold is observed and the height at which the grains are introduced and the height of the trajectory of the light beam are modified as soon as the spot reaches said point.

The modification of the height at which the grains are introduced and the displacement of the trajectory of the light beam are, preferably, carried out simultaneously.

BRIEF DESCRIPTION OF THE DRAWINGS

The characteristics of this invention and its advantages will be better understood from the detailed description of one of its forms of embodiment, illustrated by the figures attached and according to which:

FIG. 1 is a schematic view in section, along a vertical plane, of the installation enabling the invention to be carried out; and FIG. 2A and FIG. 2B show a schematic view partially in section along a vertical plane of the aforementioned installation at two states of the process.

DETAILED DESCRIPTION OF THE PREFERRED EMBODIMENTS

The installation shown schematically in FIG. 1 shows a mold 10, of cylindrical form, connected to a rotary drive apparatus, not shown, by means of a shaft 11. This mold, preferably of metal, may be provided with an internal wall 12, possibly permeable to gases.

This wall 12 defines, inside the mold 10, a substantially cylindrical space. Above the mold is situated a feed apparatus for pulverulent material, formed of a hopper or funnel, not shown, which extends in its lower part by a duct 13. The lower end of this duct is slightly cranked and is turned towards the face 14 of the wall 12.

Above the mold 10 there is also situated an optical apparatus. This comprises an emitter 15, supplying a luminous ray or beam 16, a guiding means 17 for said beam and a receiver 18.

The emitter may be, for example, a helium-neon laser producing a slender beam of light. As FIGS. 2A and 2B show, this beam 16 travels substantially along the vertical axis of a duct 19, the principal function of which is to protect the beam against perturbation. The duct 19 comprises, at its lower part, a reflecting surface 20, inclined at 45°, and also a lateral opening 21 disposed opposite said reflecting surface. The beam 16, after reflection from the surface 20, leaves through the aperture 21 along a trajectory 22 perpendicular to the face 14.

The receiver 18 is composed, for example, of a photomultiplier 23, the entry window of which, stopped down by a slit or hole of small dimensions, is directed towards the bottom of the mold 10 at an adjustable distance from the wall 12. An optical system 24 is associated with the photomultiplier 23 in such a way as to continually form the image of a precise point of the summit of layer E on its entry window.

As FIGS. 2A and 2B show, the position of the receiver 18 is regulated in such a way that its vertical axis 25 shall be at a distance $R + \Delta r$ from the axis of rotation of the mold 10. The point thus aimed at is near the internal wall face of the layer defined by the cylinder of radius R.

Before the layer E is formed, the mold 10 is set in rotation, the end of the duct 19 and the feed duct 13 are lowered to their lowest level inside the mold. The speed of rotation of the mold is sufficiently high for the grains of powder which will be introduced to remain applied to the face 14 as a result of the centrifugal force.

The hopper supplying the duct 13 is opened by means of an electrically operated valve. At this exact instant, the laser beam 22 forms on the wall 14 a light spot 26. Progressively as the layer E is formed, the spot 26 displaces radially on the inclined summit of said layer towards the axis of rotation of the mold 10. The spot 26 arrives in the axis 25 of the receiver 18, corresponding to the distance $R + \Delta r$ which is illustrated in FIG. 2A. The photomultiplier 23 now records an abrupt variation in the luminous intensity, which is represented by an increase in the voltage supplied to a control circuit. As soon as this voltage exceeds a predetermined threshold value, the circuit dispatches a logic signal to an automatic device, which in turn initiates an ascending movement of the ducts 13 and 19 through a predetermined height. These various means for controlling displacement are themselves known and will not be further explained here. At the end of this movement, the trajectory 22 of the laser beam and the cranked end of the duct 13 are situated at a specific distance above their initial positions.

The ducts 13 and 19 may be integrally fixed to independent supports, the ascending movements of which may be separately controlled. It is, however, preferable for these two ducts to be integral with one single support, for example a boring or reaming blade which, once the filling has been carries out, has the function of making the surface of the deposited layer uniform.

The displacement of the two ducts 13 and 19 through a determined height H has the effect of raising the luminous spot 26 and of displacing it radially towards the face 14, and of raising the trajectory of the powder grains, as illustrated in FIG. 2B. The powder grains again are deposited on the summit of the layer E, which causes once again the radial displacement of the spot 26 etc.

Instead of the preceding apparatus which detects the arrival of the spot at a determined radial distance, it is possible to use an apparatus which detects any radial displacement of the spot from a determined position. The first apparatus causes an intermittent raising of the ducts 13 and 19, while the second causes continuous raising. In this sense, it is possible to use an assembly of photodiodes, several hundred in number, distributed over a rectangular surface or simply aligned. These photodiodes, associated with the optical device, are disposed at the same position as the receiver 18 and may observe the whole or a part of the summit of the layer E. From the commencement of formation of the layer E, the luminous spot is formed on said layer at a point situated at some radial distance. The photodiodes on which the image of this point is formed receive the maximum luminous intensity.

The analysis of the quantity of light received by each photodiode enables the position of the luminous spot on the summit of the layer E to be continually known. It is therefore possible, for example by means of a simple feedback control loop, to control continuously or intermittently the raising of the ducts 13 and 19 in such a way that the spot will always remain very near a determined position defined by the distance $R + \Delta r$.

The figures illustrating the description show the formation of a layer of constant thickness against the cylindrical face 14 of the mold 10. It may happen that, before this operation, the internal wall face of the mold 10 is previously covered with a layer, the surface of which is irregular. With the known technique, it is not possible to obtain on this layer a second layer having a cylindrical surface. In fact, the filling is carried out by raising the duct 13 at a constant speed, fixed in advance. In these conditions, the surface of the second layer will reproduce the inequalities of the surface of the first layer.

However, the invention makes it possible to operate independent of the flow rate from the hopper, whereas the known processes demand that this flow rate shall be rigorously constant.

With the present invention, the raising of the duct 13 is governed solely by the surface geometry of the layer, the formation of which is continually followed by the receiver 18. The invention replaces a time control with a spatial control.

During the dressing of the surface of the layer by a boring or reaming blade, the quantity of material removed is considerably reduced by comparison with that which the earlier technique demanded.

All the modifications which can be applied by the person skilled in the art to the principle and to the apparatus which have just been described by way of examples remain within the scope of this invention.

What is claimed is:

1. A method of controlling the filling of a hollow mold of cylindrical shape with a pulverulent refractory material according to which method grains of material are introduced continuously into the mold, which rotates about its vertical axis, in which the grains are deposited on or near a lateral wall face of said mold in the form of a cylindrical layer having an internal radius R, said method comprising the steps of directing a beam of light in such a way as to form a luminous spot on the summit of the layer, observing the radial displacement of said spot on said summit as the grains are deposited and modifying the height at which the grains are introduced and the height of the trajectory of the luminous beam as a function of the radial position of the luminous spot on said summit.

2. A method of control according to claim 1 wherein the light beam giving rise to the spot is incident on the summit along a substantially horizontal trajectory.

3. A method according to claim 1 wherein the modification to the height at which the grains are introduced and the displacement of the trajectory of the light beam are carried out simultaneously.

4. A method according to claim 1 wherein the modification to the height at which the grains are introduced and the displacement of the trajectory of the beam of light are carried out during a continuous ascending movement.

5. A method according to claim 1 wherein the height at which the grains are introduced and the height of the trajectory of the luminous beam are continually modified in such a manner that the spot always remains at a distance defined by $R + \Delta r$, where R is the internal radius of said cylindrical layer and $\Delta r$ is the distance from the internal radius of said cylindrical layer to a predetermined reference point on the summit of said layer.

6. A method according to claim 1 wherein a precise point situated at a distance $R + \Delta r$ from the axis of rotation of the mold is observed and the height at which the grains are introduced and the height of the trajectory of the luminous beam are modified as soon as the spot reaches said point.

7. A method according to claim 1 wherein the modification to the height at which the grains are introduced and the displacement of the trajectory of the light beam are carried out with a series of intermittent ascending movements.

8. A method of control according to claim 1 wherein said spot on the summit moves between reference points that are radially disposed from the vertical axis of rotation of said mold.

9. An apparatus comprising means for causing a hollow mold to rotate about its vertical axis, a duct means supplied with a pulverulent material for introducing said pulverulent material into said mold where the material is deposited on or near a lateral wall face of said mold and forms a cylindrical layer on said lateral wall face of said mold, means for the vertical displacement of said duct means inside the mold, an emitter supplying a beam of light, a guiding means for directing said light beam at the summit of said cylindrical layer to form a luminous spot thereon, means for the vertical displacement of the guiding means, receiving means for observing the radial displacement of said spot on the summit of said cylindrical layer as the layer is formed and means for controlling the vertical displacement of at least one of the duct means and the guiding means in response to observation of the radial displacement of said spot.

10. An apparatus according to claim 9 wherein the duct means and the guiding means are integral with a single displacement means.

11. An apparatus according to claim 9 wherein said emitter comprises a helium-neon laser which supplies a beam of light which travels substantially along a vertical axis of said guiding means, wherein said guiding means comprises duct means equipped at its lower end with a reflecting surface inclined at 45° and a lateral opening opposite the reflecting surface and wherein said receiving means comprises a photomultiplier and an optical system, the aiming axis of which is vertical and is situated at a distance $R + \Delta r$ from the axis of rotation of the mold, where $R$ is the internal radius of said cylindrical layer and $\Delta r$ is the distance from the internal radius of said cylindrical layer to a predetermined reference point on the summit of said layer.

12. Apparatus according to claim 9 wherein the emitter comprises a helium-neon laser supplying a beam which travels substantially along the vertical axis of said guiding means, said guiding means comprises a duct equipped at its lower end with a reflecting surface inclined at 45° and a lateral opening opposite the reflecting surface and said receiving means comprises a series of photodiodes aimed at the entirety or a portion of the summit of the layer in formation.

13. Apparatus according to claim 9 wherein the emitter supplies a beam of light which travels substantially along the vertical axis of said guiding means, said guiding means comprises a duct equipped at its lower end with a reflecting surface inclined at 45° and a lateral opening opposite the reflecting surface and said receiving means comprises a photosensor aimed at the entirety or a portion of the summit of the layer in formation.

14. Apparatus according to claim 13 wherein said beam of light, after reflection off of said reflecting surface, travels through said lateral opening along a substantially horizontal axis thereby forming said luminous spot which displaces radially upon the summit of said cylindrical layer as the layer is formed.

* * * * *